United States Patent
Cook, III

(10) Patent No.: US 10,071,543 B2
(45) Date of Patent: Sep. 11, 2018

(54) PRECIPITATION HARDENED PARTIAL TRANSIENT LIQUID PHASE BOND

(71) Applicant: UNITED TECHNOLOGIES CORPORATION, Farmington, CT (US)

(72) Inventor: Grant O. Cook, III, Tolland, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 226 days.

(21) Appl. No.: 14/890,328

(22) PCT Filed: Feb. 27, 2014

(86) PCT No.: PCT/US2014/019013
§ 371 (c)(1),
(2) Date: Nov. 10, 2015

(87) PCT Pub. No.: WO2014/193506
PCT Pub. Date: Dec. 4, 2014

(65) Prior Publication Data
US 2016/0075119 A1 Mar. 17, 2016

Related U.S. Application Data

(60) Provisional application No. 61/829,009, filed on May 30, 2013.

(51) Int. Cl.
| | | |
|---|---|---|
| *B32B 7/02* | (2006.01) | |
| *B32B 7/04* | (2006.01) | |
| *B32B 37/14* | (2006.01) | |
| *B32B 15/01* | (2006.01) | |
| *B32B 37/06* | (2006.01) | |
| *C04B 37/02* | (2006.01) | |
| *B32B 9/00* | (2006.01) | |
| *B32B 9/04* | (2006.01) | |
| *B32B 37/04* | (2006.01) | |

(52) U.S. Cl.
CPC ............ *B32B 37/06* (2013.01); *B32B 7/02* (2013.01); *B32B 7/04* (2013.01); *B32B 9/005* (2013.01); *B32B 9/041* (2013.01); *B32B 15/01* (2013.01); *C04B 37/026* (2013.01); *B32B 37/04* (2013.01); *B32B 2255/00* (2013.01); *B32B 2255/06* (2013.01); *B32B 2255/20* (2013.01); *B32B 2255/205* (2013.01); *B32B 2307/306* (2013.01); *B32B 2307/308* (2013.01); *B32B 2307/536* (2013.01); *B32B 2307/718* (2013.01); *B32B 2311/00* (2013.01); *B32B 2315/02* (2013.01); *B32B 2605/00* (2013.01); *B32B 2605/18* (2013.01); *C04B 2237/12* (2013.01); *C04B 2237/122* (2013.01); *C04B 2237/72* (2013.01)

(58) Field of Classification Search
CPC ......... B32B 37/06; B32B 37/14; B32B 15/01; B32B 7/04; B32B 7/02; B32B 2605/18; C04B 2237/72; C04B 2237/122
See application file for complete search history.

(56) References Cited

U.S. PATENT DOCUMENTS

| | | | | |
|---|---|---|---|---|
| 5,234,152 A | * | 8/1993 | Glaeser | B23K 20/023 228/121 |
| 2005/0098609 A1 | | 5/2005 | Greenhut et al. | |
| 2008/0035707 A1 | | 2/2008 | Glaeser | |

FOREIGN PATENT DOCUMENTS

| | | | |
|---|---|---|---|
| EP | 0117671 A1 | | 9/1984 |
| EP | 1 042 103 B1 | * | 12/2004 |
| EP | 1042103 B1 | | 12/2004 |
| EP | 1642667 A1 | | 4/2006 |

OTHER PUBLICATIONS

International Search Report Application No. PCT/US2014/019013 dated Jul. 24, 2014.
"Overview of transient liquid phase and partial transient liquid phase bonding", Journal of Materials Science, Kluwer Academic Publishers, BO, vol. 46, No. 16, May 7, 2011 pp. 5305-5323.
Supplementary European Search Report for Application No. EP 14 80 4066.
Written Opinion of International Searching Authority for International Application No. PCT/US2014/019013, dated Jul. 24, 2014 6 pages.

\* cited by examiner

*Primary Examiner* — Robert Harlan
(74) *Attorney, Agent, or Firm* — Cantor Colburn LLP

(57) ABSTRACT

A precipitation-hardened partial transient liquid phase bond and method of making same is provided. The bond is created at a bonding temperature and then, based on the phase diagrams corresponding to the materials in the interlayer between the bonded materials, the bond is held at a lower heat-treatment temperature to achieve a precipitation-hardened structure.

20 Claims, 4 Drawing Sheets

PRECIPITATION HARDENED PARTIAL TRANSIENT LIQUID PHASE BOND

CROSS-REFERENCE TO RELATED APPLICATION

This Application is a U.S. National Stage under 35 USC § 371 of International Patent Application No. PCT/US14/019,013 filed on Feb. 27, 2014 based on U.S. Provisional Patent Application Ser. No. 61/829,009 filed on Mar 20, 2013.

FIELD OF THE DISCLOSURE

The present disclosure generally relates to a precipitation-hardened partial transient liquid phase bond and method of making same. More specifically, this disclosure relates to a method of applying a ceramic coating on a metallic substrate using precipitation hardening of a partial transient liquid phase bond.

BACKGROUND OF THE DISCLOSURE

Ceramic-plated metallic or composite materials consist of a metallic or composite substrate coated with ceramic. These materials are lightweight and, by virtue of the ceramic plating, exhibit markedly enhanced thermal strengths over the strength of the metallic or composite substrate alone. These properties have made them attractive materials for component fabrication in many industries such as aerospace, automotive, and military equipment industries, where lightweight thermally resistant structures are desired. For example, ceramic-coated metallic materials continue to be explored for use in gas turbine engine applications to reduce the overall weight of the engine and improve engine efficiency and fuel savings. However, the strength and performance characteristics of ceramic-plated materials may be dependent upon the integrity of the interfacial bond between the ceramic plating and the underlying metallic or composite substrate. As such, the ceramic coating may become disengaged from the substrate surfaces.

The interfacial bond strength between the ceramic plating and the underlying substrate also may be compromised upon exposure to high temperatures, such as those experienced during some high-temperature engine operations. If ceramic-coated components are exposed to temperatures over a critical temperature or critical temperature range during operation, the interfacial bond between the ceramic coating and the substrate may be at least partially degraded, which may lead to structural break-down of the component and possible in-service failure. To provide performance characteristics necessary for the safe use of ceramic-coated materials in gas turbine engines and other applications, strategies are needed to improve the interfacial bond strength and the high temperature stability of the ceramic-coated materials.

Transient liquid phase (TLP) and partial transient liquid phase (PTLP) bonding processes have been found to be useful alternatives to welding and brazing as ways to bond metals and ceramics. PTLP bonding is often performed with elemental interlayers designed to eventually form a solid solution after isothermal solidification and subsequent homogenization steps. However, the resulting strength of the solid-solution bond may not be sufficient for certain applications, especially in the aerospace industry. The present disclosure is directed to solving this problem by providing a method for achieving a stronger bond in a PTLP bonding process.

SUMMARY OF THE DISCLOSURE

The present disclosure relates to a precipitation-hardened partial transient liquid phase bond and method of making same. The bond is created at a bonding temperature and then, based on the phase diagrams corresponding to the materials in the interlayer between the bonded materials, the bond is held at a lower heat-treatment temperature to achieve a precipitation-hardened structure.

In one aspect the disclosure is directed to a method of bonding a first material, such as a coating, to a second material, such as a substrate. The method comprises the steps of:

placing a multi-layer interlayer of metallic materials between the first material and the second material to create an assembly, the interlayer having a thickness;

heating the assembly to a bonding temperature to produce a liquid in the bonding region;

holding the assembly at the bonding temperature for a suitable time until the liquid has isothermally solidified due to diffusion within the interlayer to create a sufficiently homogenized interlayer; and precipitation hardening the bonded assembly by holding the assembly at a hardening temperature lower than the bonding temperature for a specified period of time, thereby creating a precipitation-hardened PTLP bond;

wherein the bonding temperature and interlayer thicknesses are selected to yield a solid-solution composition just outside the two-phase region.

The first material may be ceramic and the second material may be metallic or composite. The interlayer may comprise thin layers disposed on either side of a relatively thicker refractory layer. The refractory layer may be made of a refractory material and the thin layers may be made of a material having a lower melting point than the refractory material. The thin layers and the refractory layer may be made of metallic materials.

In another aspect the disclosure is directed to a bonded assembly comprising a first material bonded to a second material by a precipitation-hardened PTLP bond. The bonded assembly may comprise an interlayer comprising a refractory layer made of a refractory component interposed between relatively thinner thin layers made of a second (and possibly third) component. The interlayer may be heated to a bonding temperature to produce a liquid, held at the bonding temperature for a suitable time until the liquid has isothermally solidified due to diffusion within the interlayer to create a sufficiently homogenized interlayer, and precipitation-hardened by holding the interlayer at a hardening temperature lower than the bonding temperature for a specified period of time. The bonding temperature and interlayer thicknesses may be selected to yield a solid-solution composition just outside the two-phase region of the interlayer components.

In still another aspect of the disclosure a bonded assembly is provided, the bonded assembly comprising a first material, a second material and an interlayer disposed between the first and second materials, the interlayer comprising an isothermally-solidified, precipitation-hardened homogenized mixture of a metallic refractory element and a metallic thin layer element having a lower melting point than the refractory material.

Although the different examples described herein may have the specific components shown in the illustrations, embodiments of this disclosure are not limited to those particular combinations of components. It is possible to use some of the components or features from one of the examples in combination with features or components from another one of the examples.

Figure 1:
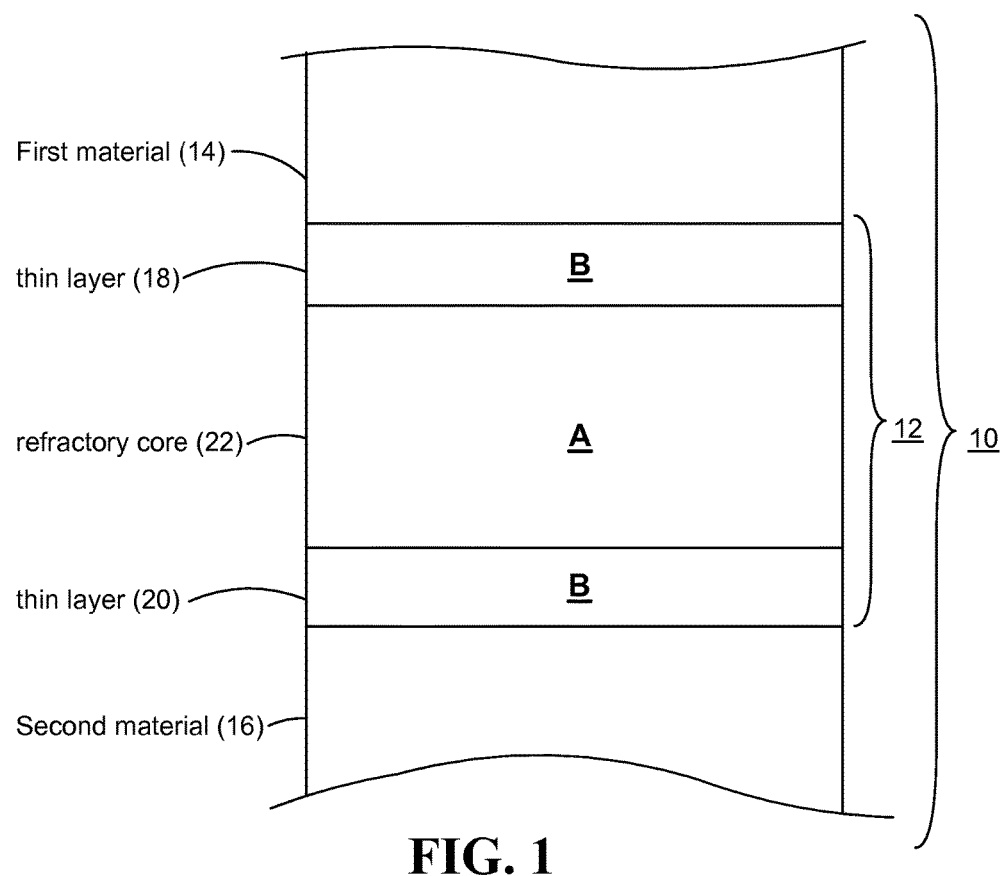
FIG. 1 is a schematic representation illustrating an assembly for forming a precipitation-hardened partial transient liquid phase bond between a first material and a second material in accordance with the present disclosure.

It should be understood that the drawings are not necessarily drawn to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments disclosed herein.

DETAILED DESCRIPTION

The present disclosure relates to a precipitation-hardened partial transient liquid phase bond and method of making same. Basically, a PTLP bond is created at one temperature and then, based on the phase diagrams corresponding to the the materials in the interlayer, the bond is held at a lower heat-treatment temperature to achieve a precipitation-hardened structure.

Transient liquid phase (TLP) bonding is a process that joins materials using an interlayer. When the interlayer is heated it melts and at least one element diffuses into the materials being joined, causing isothermal solidification of the bond.

The TLP bonding process generally involves the following steps:
1. Placing a thin interlayer between the materials to be bonded to create an assembly;
2. Heating the assembly to the bonding temperature to produce a liquid in the bond region;
3. Holding the assembly at the bonding temperature until the liquid has isothermally solidified due to diffusion; and
4. Homogenizing the bond at a suitable heat-treating temperature.

The bond process may consist of placing a thin interlayer between opposing materials, such as a metallic plating and a metallic substrate. The interlayer can be in many forms, including thin foil, powder, paste, vapor deposition, or electroplating. Pressure may be applied to the opposing materials, and various heat sources used, including radiation, conduction, and radio-frequency induction.

TLP bonding may be used to bond metallic coatings or platings onto the surface of a substrate. Although some conventional coating methods for metallic materials (e.g., cold spraying) may provide a mechanical interlock between the metallic substrate and the coating, TLP bonding may provide a more robust bond between the coating and the substrate. The main advantage of TLP bonding is that the resulting bond between the coating and the substrate typically has a melting temperature above the temperature used for TLP bonding so that the formed bond may operate at temperatures well above the bonding temperature. This feature may be advantageous, for example, when joining temperature-sensitive metals whose microstructures could be damaged by too much thermal energy input. TLP bonding is often used in high-temperature applications where welding, brazing, and diffusion brazing cannot be used. The interlayer material may be any metallic material.

Partial transient liquid phase (PTLP) bonding is a variant of TLP typically used to join ceramics. In PTLP bonding, the interlayer may comprise thin layers of low-melting point metals or alloys on each side of a thicker refractory metallic layer. Among the advantages of PTLP bonding are the following: (1) The dual nature of the multi-layer interlayer combines some beneficial properties of brazing and diffusion bonding. (2) Lower bonding temperatures can minimize thermally induced stresses.

FIG. 1 is a schematic of a PTLP bonding assembly 10 according to the disclosure. The assembly 10 comprises a multi-layer interlayer 12 disposed between a first material 14 and a second material 16. The first material 14 may be a coating or plating, including a ceramic coating. The second material 16 may be a substrate, such as structure made of metallic, ceramic, or composite materials. The substrate may be a component of a jet engine. The first material 14 may be applied to one or more surfaces of the second material 16 and may be capable of imparting the second material 16 with one or more properties favorable to its operation and use, such as hardness or enhanced thermal stability. The first material 14 may be applied to the surfaces of the second material 16 using any conventional means, including chemical vapor deposition, physical vapor deposition, cold spraying, or plasma spraying. The first material 14 may be non-metallic while the second material 16 is metallic. Alternatively, the first material 14 and the second material 16 may both be non-metallic.

The depicted interlayer 12 consists of thin layers 18 and 20 on either side of a refractory layer or core 22, but it should be understood that there can be multiple layers on each side of the refractory layer 22. As explained in more detail below, the thin layers 18 and 20 melt and diffuse into the thicker refractory core 22 during the bonding process while the refractory core 22 stays solid. The refractory layer 22 may be made of a refractory material including without limitation a metallic material and the thin layers 18 and 20 may be made of a material having a lower melting point than the refractory material 22. Also, thin layer 18 and thin layer 20 can be composed of different metallic materials.

Figure 2:
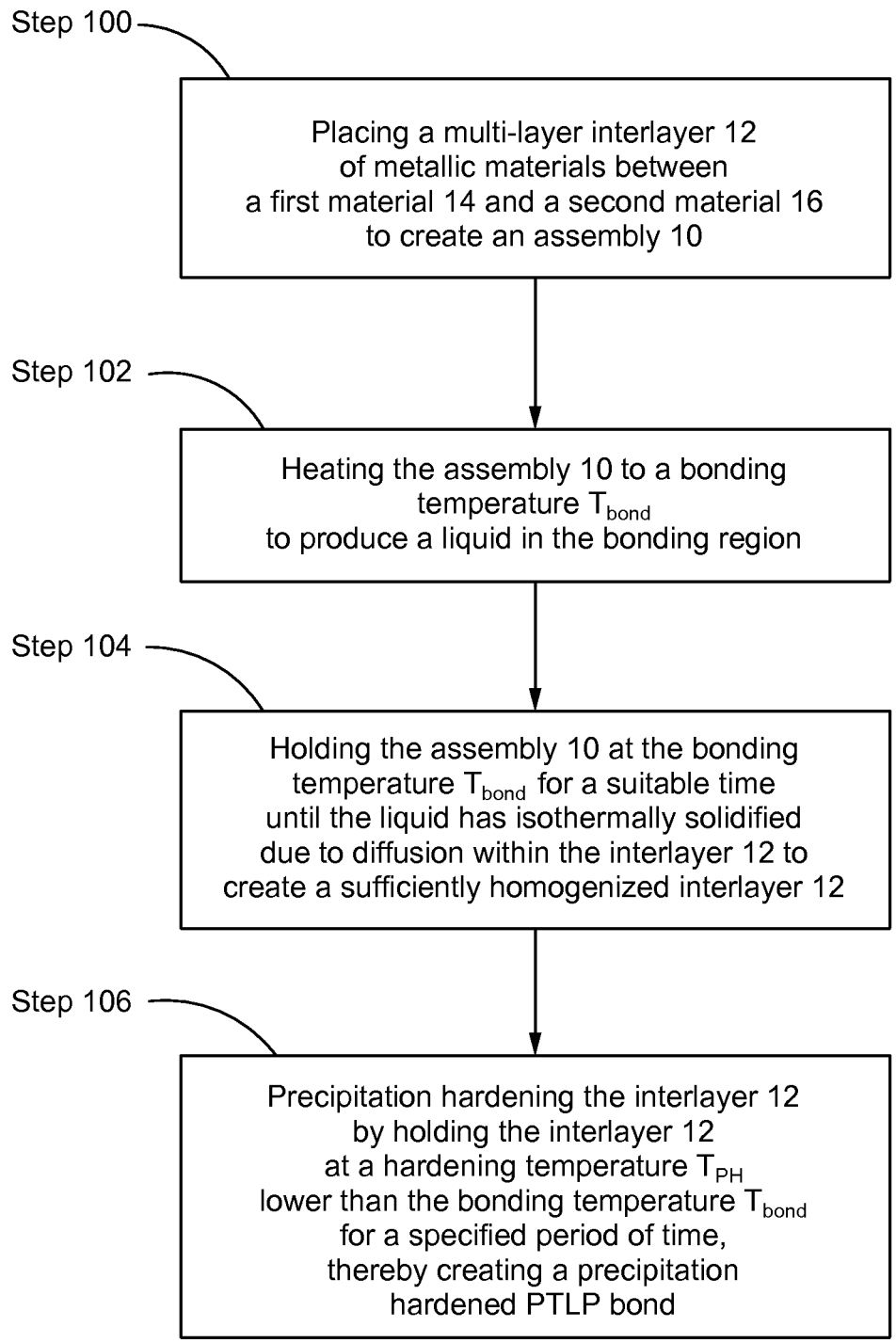
FIG. 2 is a flow diagram illustrating steps involved in the creation of a precipitation hardened partial transient liquid phase bond in accordance with a method of the present disclosure.

FIG. 2 is a flow-chart diagram illustrating steps involved in the creation of a precipitation-hardened partial transient liquid phase bond in accordance with a method of the present disclosure. The method may comprise the following steps:

Step 100: Placing a multi-layer interlayer 12 of metallic materials between a first material 14 and a second material 16 to create an assembly 10. As noted above, the interlayer 12 may comprise thin layers 18 and 20 on either side of a relatively thicker refractory layer 22. The first material 14 may be a coating, such as a ceramic coating, to be applied to a second material or substrate 16, such as a metallic component. The multi-layer interlayer 12 may be applied to the surface of the second (substrate) material 14 by any conventional means, including foil layup, powder application, plating, chemical vapor deposition, physical vapor deposition, cold spraying, or plasma spraying. The first (coating) material 14 may then be applied over the interlayer 12 using any suitable means.

Step 102: Heating the assembly 10 to a bonding temperature $T_{bond}$ to produce a liquid in the bonding region, e.g., the region of contact between the first and second materials 14 and 16 to be bonded together. Heating may be accomplished by any conventional means, such as radiation, conduction, radio-frequency induction, resistance, laser, or infrared heating, and can cause direct or eutectic melting in the interlayer.

Step 104: Holding the assembly 10 at the bonding temperature $T_{bond}$ for a suitable time until the liquid has isothermally solidified due to diffusion within the interlayer 12 to create a sufficiently homogenized interlayer 12. The bonding time depends on the materials in the assembly 10, particularly the materials in the interlayer 12.

Step 106: Precipitation hardening the bonded interlayer 12 by holding the assembly 10 at a hardening temperature $T_{PH}$ lower than the bonding temperature $T_{bond}$ for a specified period of time, thereby creating a precipitation-hardened PTLP bond. The assembly 10 may be cooled below the hardening temperature $T_{PH}$ and then heated back up to the hardening temperature $T_{PH}$, or simply cooled down from the bonding temperature $T_{bond}$ to the hardening temperature $T_{PH}$ and held there until the bond is hardened.

Figure 3:
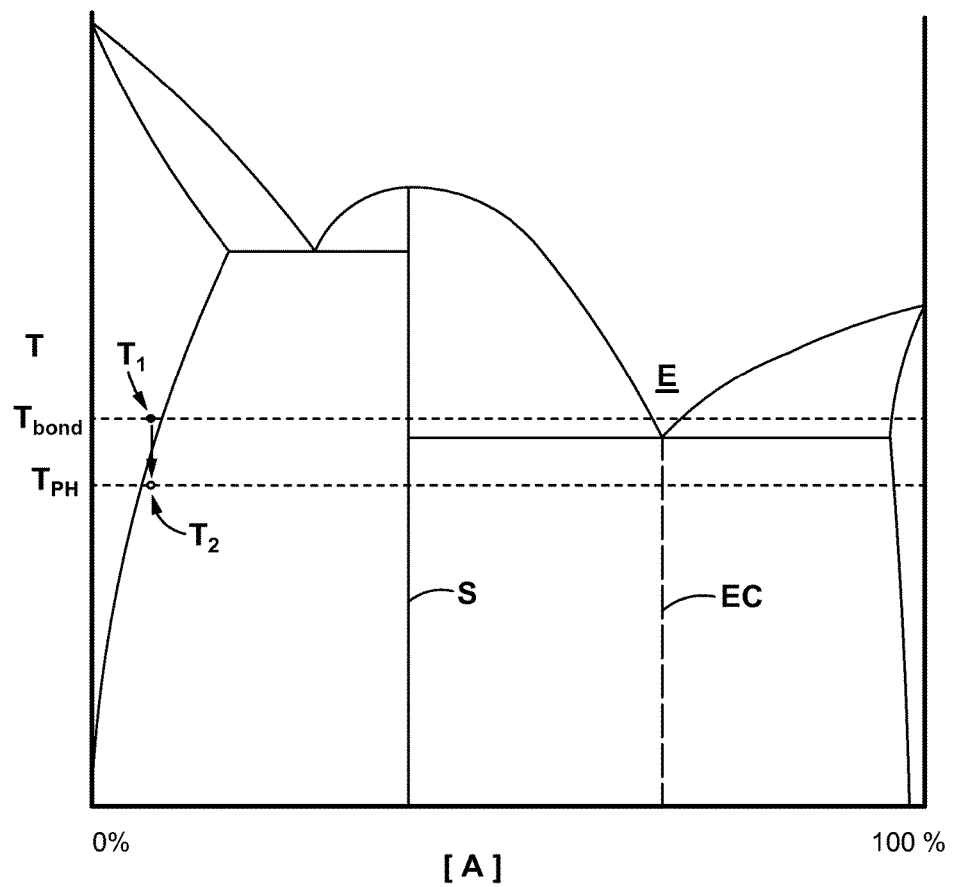
FIG. 3 is a phase diagram corresponding to a multi-layer interlayer and exhibiting eutectic melting used in making a precipitation-hardened partial transient liquid phase bond according to the disclosure.

FIG. 3 is a phase diagram of a two-component (binary) interlayer 12 used in making a precipitation-hardened partial transient liquid phase bond according to the disclosure. The two components may be any suitable components, such as metallic elements, and are indicated here as A and B. Temperature is shown on the vertical (Y) axis. The horizontal (X) axis depicts the concentration of element A in element B, where element A is the higher-melting-point material, and thus the material that makes up the refractory core 22 (FIG. 1). Element B has a lower melting point than element A and thus makes up the thin layers 18 and 20. The left hand side of the diagram represents 100% B while the right side represents 100% A.

As shown in the diagram, when the multi-layer interlayer 12 is heated to a bonding temperature ($T_{bond}$), the thin layers of element B diffuse into element A and liquefy as indicated by the eutectic trough E. The vertical line EC intersecting the eutectic trough E represents the eutectic composition of A and B, which is about ⅓ B and ⅔ A. In other words, a liquid is formed through a eutectic reaction with the refractory core 22 by each thin layer 18 and 20 of element B. The liquid that is formed wets the first and second materials 14 and 16 while diffusing into the solid refractory core 22. Holding the assembly 10 at the bonding temperature $T_{bond}$ causes the liquid to solidify isothermally due to homogenization of the entire bond region, creating a refractory bond.

The vertical line S represents a stoichiometric intermetallic phase, which in the diagram is approximately 40% element A and 60% element B, according to the Gibbs' phase rule. This intermetallic phase will form at the interface between element A and and element B while continued diffusion into the refractory core 22 will eventually cause the interlayer 12 to become completely homogenous.

After creating an homogenous interlayer 12, the composition of the interlayer 12, represented by point T1 in the phase diagram, is similar to that of an alloy after solution heat treating. The particles of element B in the interlayer 12 have gone into solution in element A and are equally distributed throughout the interlayer 12.

Next, the interlayer 12 is held at a hardening temperature $T_{PH}$ lower than the bonding temperature $T_{bond}$ as represented by point T2 for a specified period of time, thereby creating a precipitation-hardened PTLP bond. The hardening time typically is longer than the bonding time. By maintaining the assembly 10 for a sufficient amount of time at the lower hardening temperature $T_{PH}$, the particles start to precipitate and form a structure that is hardened by the intermetallic particles, whose composition is represented by the vertical line S and which are evenly distributed throughout the interlayer structure 12.

Thus the interlayer may be a mixture of two metallic elements A and B which can exist in one or more phases depending on temperature and relative concentrations of the two elements. A phase diagram of the mixture like that shown in FIG. 3 may include a two-phase region. The bonding temperature $T_{bond}$ and the interlayer thicknesses are selected to yield a solid-solution composition just outside the two-phase region.

Figure 4:
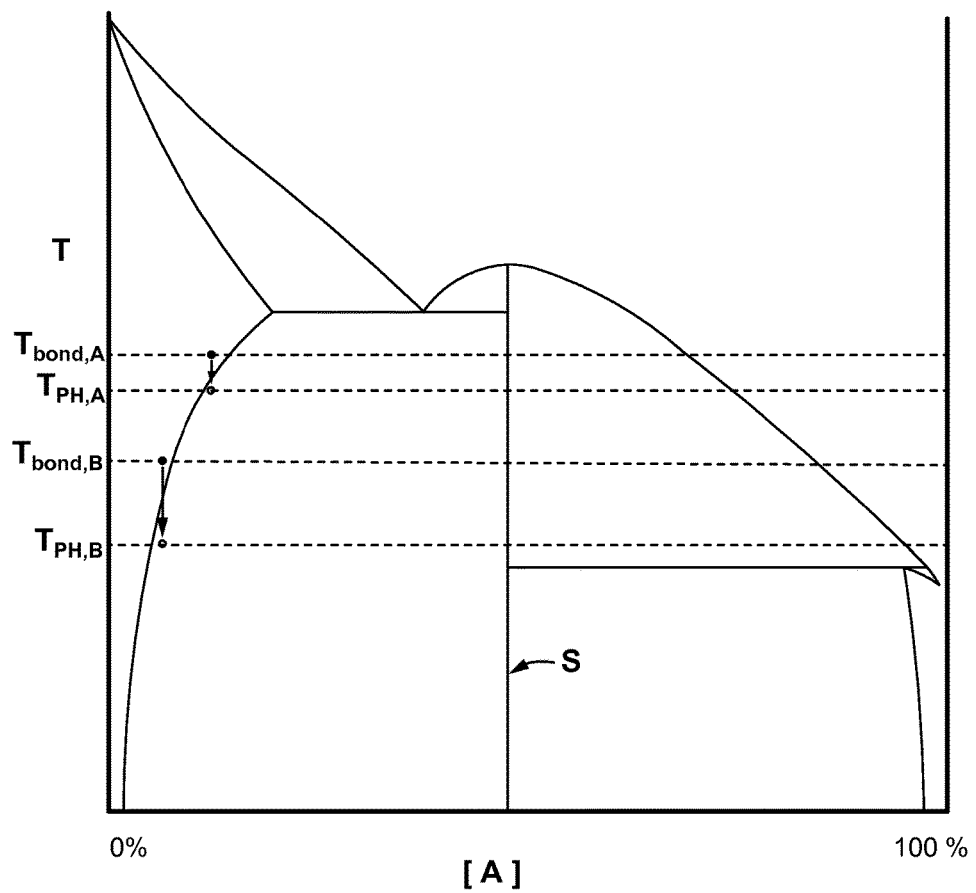
FIG. 4 is a phase diagram corresponding to a multi-layer interlayer and exhibiting direct (or peritectic) melting used in making a precipitation-hardened partial transient liquid phase bond according to the disclosure.

FIG. 4 is a phase diagram of another two-component (binary) interlayer 12 used in making a precipitation-hardened partial transient liquid phase bond according to the disclosure, wherein the interlayer melting is accomplished via direct melting of the relatively thinner layers (element A). Two potential sets ($T_A$ and $T_B$) of bonding and hardening temperatures are shown in the diagram. It is readily apparent from the diagram that the difference between the bonding temperature $T_{bond,A}$ and the hardening temperature $T_{PH,A}$ of temperature set A is less than the difference between the bonding temperature $T_{bond,B}$ and the hardening temperature $T_{PH,B}$ of temperature set B. Since the advantages of a precipitation-hardened bonded assembly are limited to operating at or below the precipitation-hardening temperature $T_{PH}$, it is desirable to keep the bonding temperature $T_{bond}$ and the hardening temperature $T_{PH}$ close together. Operating a precipitation-hardened PTLP bond above $T_{PH}$ will cause the bond to homogenize (solution heat treat) and revert to a typical, solid-solution PTLP bond. Thus, set A in the diagram is the preferred set of bonding and hardening temperatures, even though the assembly resulting from the set B temperatures has a higher absolute remelting temperature (when comparing typical, solid-solution PTLP bonds) because the operating temperature limit $T_{PH,A}$ for set A is higher than the operating temperature limit $T_{PH,B}$ for set B. Furthermore, the higher strength capability at lower temperatures of the precipitation-hardened bond resulting from the set A temperatures can be of greater benefit than the higher temperature capability of a typical solid-solution PTLP bond resulting from the lower, set B, temperatures.

With respect to the interlayer 12 shown in FIG. 1 and demonstrated in FIGS. 3 and 4, the thin layer 18 and the thin layer 20 can be composed of different metallic materials. To achieve a precipitation-hardened PTLP bond in this case, the relevant ternary phase diagram and/or both associated binary phase diagrams should be assessed to determine the interlayer thicknesses, bonding temperature $T_{bond}$, and hardening temperature $T_{PH}$.

BENEFITS/INDUSTRIAL APPLICABILITY

From the foregoing, it can therefore be seen that the present disclosure can find industrial applicability in many situations, including, but not limited to, industries requiring light-weight and high-strength hybrid components having improved strength and wear resistance, including components that operate in high-temperature environments, such as combustors in jet engines. The technology as disclosed herein can provide components encapsulated in one or more ceramic coating layers to increase the temperature resistance of the component, resist delamination, and improve the resistance of the coating against environmental effects such as erosion and foreign-object damage. Furthermore, as disclosed herein, ceramic plating layers may be introduced on the surface of ceramic, metallic, or composite components to provide delamination-resistant hybrid composite structures having ceramic plating layers. The technology as disclosed herein may find wide industrial applicability in a wide range of areas including, but not limited to, aerospace industries, automotive industries, and sporting industries.

While the present disclosure has been shown and described in terms of one or more exemplary embodiments, it will be understood by one skilled in the art that various changes in detail may be effected therein without departing from the spirit and scope of the disclosure as defined by claims that may be supported by the written description and drawings. In particular, this disclosure can find applicability bonding a metallic coating to a non-metallic substrate, a metallic substrate to a non-metallic substrate, or a non-metallic substrate to a non-metallic substrate. Further, where these exemplary embodiments (and other related derivations) are described with reference to a certain number of elements it will be understood that other exemplary embodiments may be practiced utilizing either less than or more than the certain number of elements.

What is claimed is:

1. A method of bonding a first material to a second material, the first material and second material defining a bonding region, the method comprising the steps of:
   placing a multi-layer interlayer of metallic materials between the first material and the second material to create an assembly, the interlayer having a thickness;
   heating the assembly to a bonding temperature to produce a liquid in the bonding region;
   holding the assembly at the bonding temperature for a suitable time until the liquid has isothermally solidified due to diffusion within the interlayer and until a sufficiently homogenized interlayer has been created; and
   precipitation hardening the interlayer by holding the interlayer at a hardening temperature lower than the bonding temperature for a specified period of time, thereby creating a precipitation-hardened partial transient liquid phase (PTLP) bond.

2. The method of claim 1 wherein the number of layers in the multi-layer interlayer is three.

3. The method of claim 2 wherein:
   the interlayer comprises thin layers and disposed on either side of a refractory layer.

4. The method of claim 3 wherein:
   the refractory layer is made of refractory material and the thin layers are made of a material having a lower melting point than the refractory material.

5. The method of claim 4 wherein:
   the thin layers and the refractory layer are made of metallic materials.

6. The method of claim 1 wherein:
   The first material is non-metallic and the second material is metallic.

7. The method of claim 6 wherein:
   the first material is ceramic.

8. The method of claim 1 wherein:
   the first material is non-metallic and the second material is non-metallic.

9. The method of claim 1 wherein:
   the inter layer is a mixture of two metallic elements which can exist in one or more phases depending on temperature and relative concentrations of the two elements;
   a phase diagram of the mixture includes a two-phase region; and
   the bonding temperature and the interlayer thickness are selected to yield a solid solution composition just outside the two-phase region.

10. A bonded assembly comprising:
    a first material bonded to a second material by a precipitation-hardened partial transient liquid phase (PTLP) bond.

11. The bonded assembly of claim 10 further comprising:
    an interlayer that has a thickness and comprises a refractory layer made of a refractory component and having a thickness, the refractory layer interposed between relatively thinner thin layers each made of a component different from the refractory component;
    wherein the interlayer has been heated to a bonding temperature to produce a liquid, held at the bonding temperature for a suitable time until the liquid has isothermally solidified due to diffusion within the interlayer and has created a sufficiently homogenized interlayer, and precipitation-hardened by holding the interlayer at a hardening temperature lower than the bonding temperature for a specified period of time.

12. The bonded assembly of claim 11 wherein:
    the inter layer is a mixture of two metallic elements which can exist in one or more phases depending on temperature and relative concentrations of the two elements;
    a phase diagram of the mixture includes a two-phase region; and the bonding temperature and interlayer thicknesses are selected to yield a solid-solution composition just outside the two-phase region of the interlayer components.

13. The bonded assembly of claim 11 wherein:
    the two thin layers are made of the same material.

14. The bonded assembly of claim 11 wherein:
    the two thin layers are made of different materials.

15. The bonded assembly of claim 11 wherein:
    the refractory layer is made of a refractory material and the thin layers are made of a second material having a lower melting point than the refractory material.

16. The bonded assembly of claim 11 wherein:
    the thin layers and the refractory layer are made of metallic materials.

17. The bonded assembly of claim 11 wherein:
    the first material is non-metallic and the second material is metallic.

18. The bonded assembly of claim 11 wherein:
    the first material is non-metallic and the second material is non-metallic.

19. A bonded assembly comprising:
    a first material;
    a second material; and
    an interlayer disposed between the first and second materials, the interlayer comprising an isothermally-solidified, precipitation-hardened homogenized mixture of a metallic refractory element and a metallic thin layer element having a lower melting point than the metallic refractory material.

20. The bonded assembly of claim 19 wherein:
the first material is a ceramic coating; and
the second material is a metallic substrate.

\* \* \* \* \*